(12) United States Patent
Kovie

(10) Patent No.: US 7,862,269 B2
(45) Date of Patent: Jan. 4, 2011

(54) VEHICLE CARGO BED

(75) Inventor: David Kovie, Livonia, MI (US)

(73) Assignee: Nissan North America, Inc., Franklin, TN (US)

( * ) Notice: Subject to any disclaimer, the term of this patent is extended or adjusted under 35 U.S.C. 154(b) by 822 days.

(21) Appl. No.: 11/757,142

(22) Filed: Jun. 1, 2007

(65) Prior Publication Data

US 2008/0298923 A1    Dec. 4, 2008

(51) Int. Cl.
B60P 7/08    (2006.01)

(52) U.S. Cl. .................. 410/121; 410/102; 410/104; 410/106; 410/32; 410/94; 296/41

(58) Field of Classification Search ......... 410/104–106, 410/110, 115, 116, 102, 112, 42, 32, 94, 410/121, 153, 155, 36, 143, 150; 296/37.6, 296/36, 57.1, 26.08, 181.3, 183.1, 32–34, 296/50, 51, 39.2; 224/402–405, 510, 531, 224/554
See application file for complete search history.

(56) References Cited

U.S. PATENT DOCUMENTS

| | | | |
|---|---|---|---|
| 3,628,578 | A | 12/1971 | Berg |
| 4,707,016 | A | 11/1987 | McDonald |
| 4,909,559 | A | 3/1990 | Zettle |
| 5,169,201 | A | 12/1992 | Gower |
| 5,556,151 | A | 9/1996 | New et al. |
| 5,921,603 | A | 7/1999 | Karrer |
| 6,224,127 | B1 | 5/2001 | Hodge |
| 6,286,884 | B1 | 9/2001 | Speece |
| 7,513,726 | B1 * | 4/2009 | Comiskey, Jr. ............ 410/32 |

* cited by examiner

*Primary Examiner*—Stephen Gordon
(74) *Attorney, Agent, or Firm*—Global IP Counselors, LLP

(57) ABSTRACT

A vehicle cargo bed includes a cargo bed floor, a wall structure and an attachment member. The cargo bed floor has an approximately horizontal cargo bed surface. The wall structure at least partially surrounds the cargo bed surface. At least a portion of the wall structure has an upper end. The attachment member is secured to the upper end of the portion of the wall structure defining an approximately horizontal first surface disposed above the cargo bed surface. The first surface has a linearly extending scalar demarcations formed thereon.

32 Claims, 14 Drawing Sheets

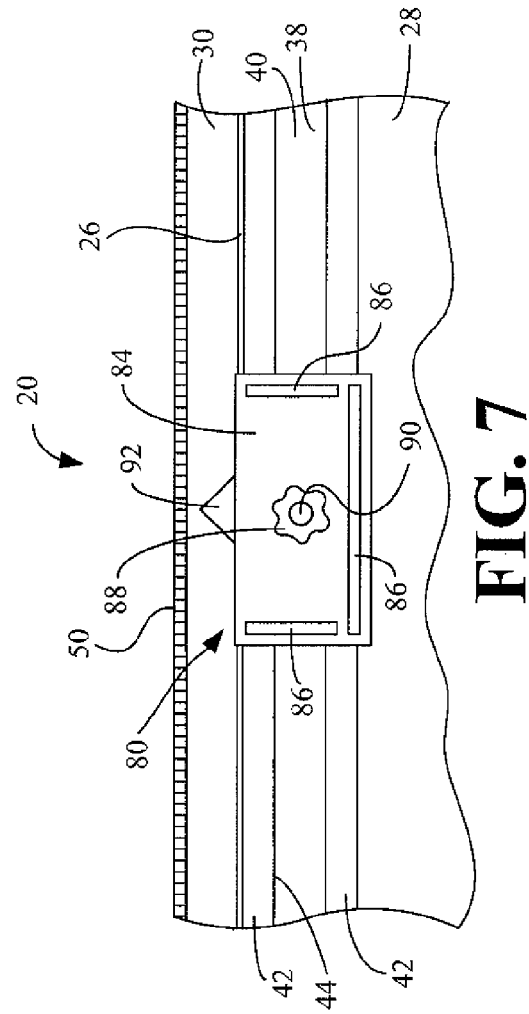
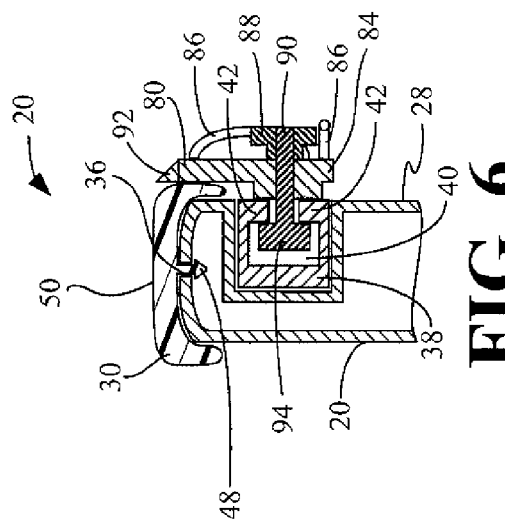
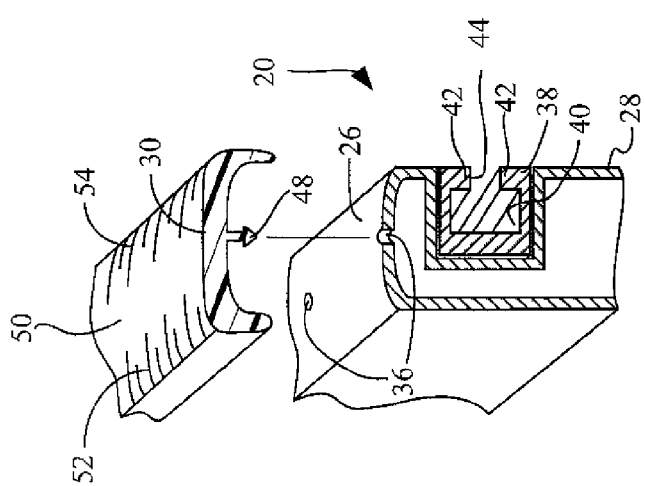

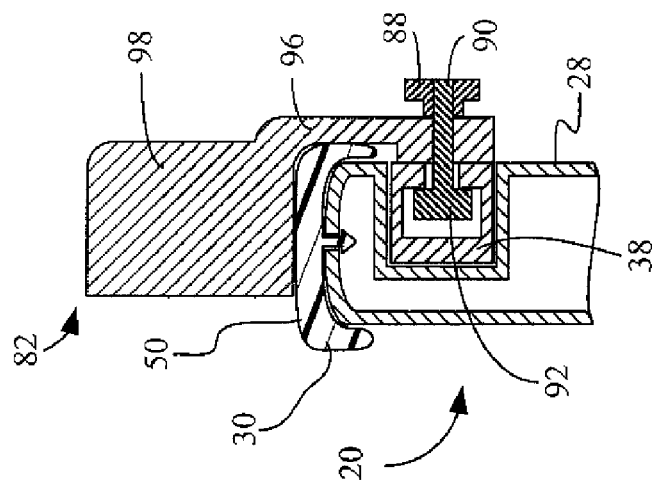
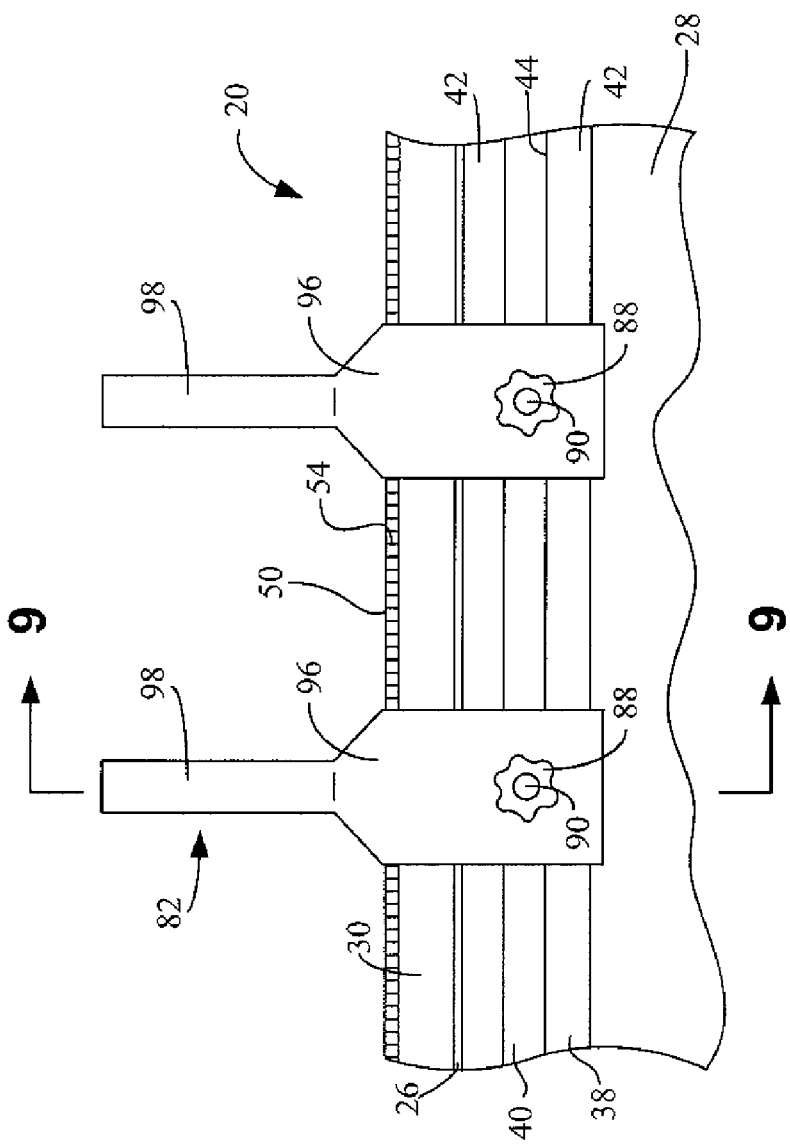
FIG. 9
FIG. 8

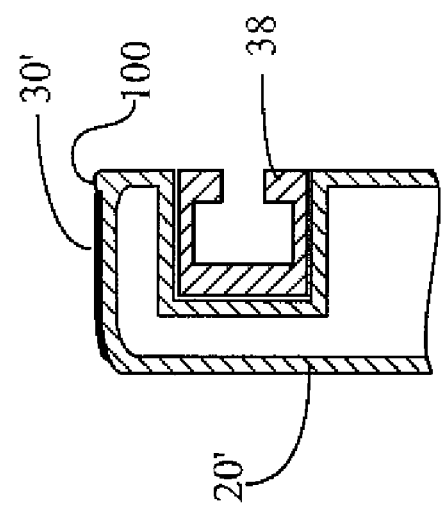
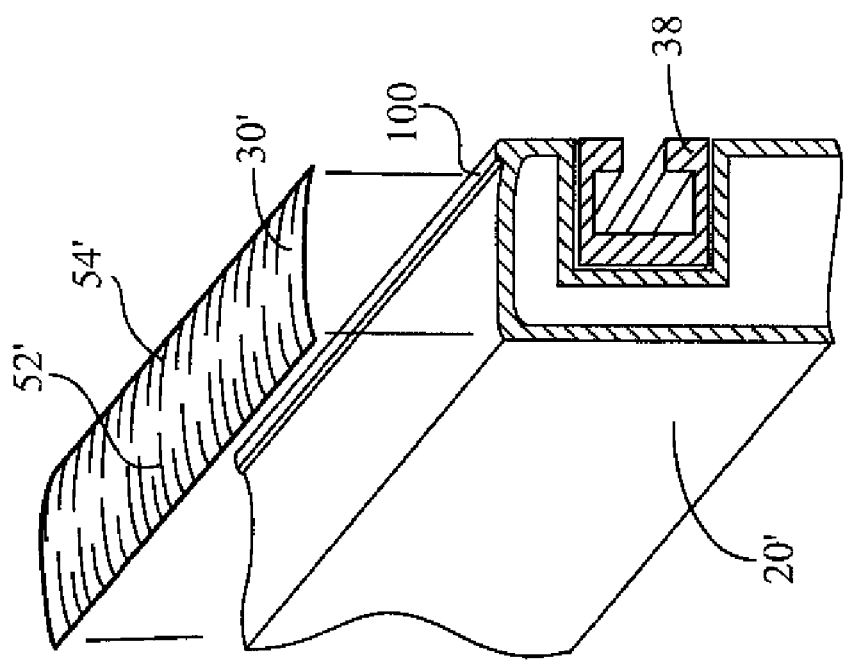

US 7,862,269 B2

VEHICLE CARGO BED

BACKGROUND OF THE INVENTION

1. Field of the Invention

The present invention generally relates to vehicle cargo bed. More specifically, the present invention relates to vehicle cargo bed that includes scalar demarcations along portions of the cargo bed.

2. Background Information

Vehicles such as pickup trucks having a cargo bed are often used in construction related projects by both homeowners and professionals in commercial applications. In such applications, a homeowner or a professional craftsman routinely needs to measure raw materials, such as wood, pipes, etc. During the course of the day, materials can be repeatedly measured prior to, for example, cutting the materials to a specific length. If measuring tool(s) are accidentally left on the job site remote from the vehicle, upon returning to the vehicle, measuring the material can be frustrating, requiring extra trips back and forth from the job site to the vehicle.

In view of the above, it will be apparent to those skilled in the art from this disclosure that there exists a need for an improved vehicle that includes a means for measuring materials hauled in the vehicle. This invention addresses this need in the art as well as other needs, which will become apparent to those skilled in the art from this disclosure.

SUMMARY OF THE INVENTION

One object of the present invention is to provide a vehicle cargo bed with scalar demarcations that allow easy and simple measurement of materials or cargo transported by in the vehicle cargo bed.

Another object of the present invention is to provide a protective attachment member to one or more upper surfaces surrounding a vehicle cargo bed and providing that attachment member with scalar demarcations for use as a measuring device.

In accordance with one aspect of the present invention, a vehicle cargo bed includes a cargo bed floor, a wall structure and an attachment member. The cargo bed floor includes an approximately horizontal cargo bed surface. The wall structure at least partially surrounds the cargo bed surface and at least a portion of the wall structure has an upper end. The attachment member is secured to the upper end of the portion of the wall structure defining an approximately horizontal first surface disposed above the cargo bed surface. The first surface has a linearly extending scalar demarcations formed thereon.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 5 is an exploded cross-sectional perspective view of a portion of the side wall taken along the line 5-5 in FIG. 4 in accordance with the first embodiment of the present invention;

FIG. 6 is a cross-sectional side view of a portion of the side wall and the marker cleat taken along the line 6-6 in FIG. 4 in accordance with the first embodiment of the present invention;

FIG. 7 is a side elevational view of the side wall showing the marker cleat installed thereon in accordance with the first embodiment of the present invention;

FIG. 8 is another side elevational view of one of the side walls showing the cargo movement restricting members installed thereon in accordance with the first embodiment of the present invention;

FIG. 9 is a cross-sectional view of the side walls taken along the line 9-9 in FIGS. 8 showing details of one of the cargo movement restricting members in accordance with the first embodiment of the present invention;

FIG. 14 is an exploded, perspective cross-sectional view of a portion of a vehicle side wall showing a decal with scalar demarcations in accordance with a second embodiment of the present invention;

FIG. 15 is cross-sectional side view of the portion of a vehicle side wall showing the decal fixed to the side wall in accordance with the second embodiment of the present invention;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
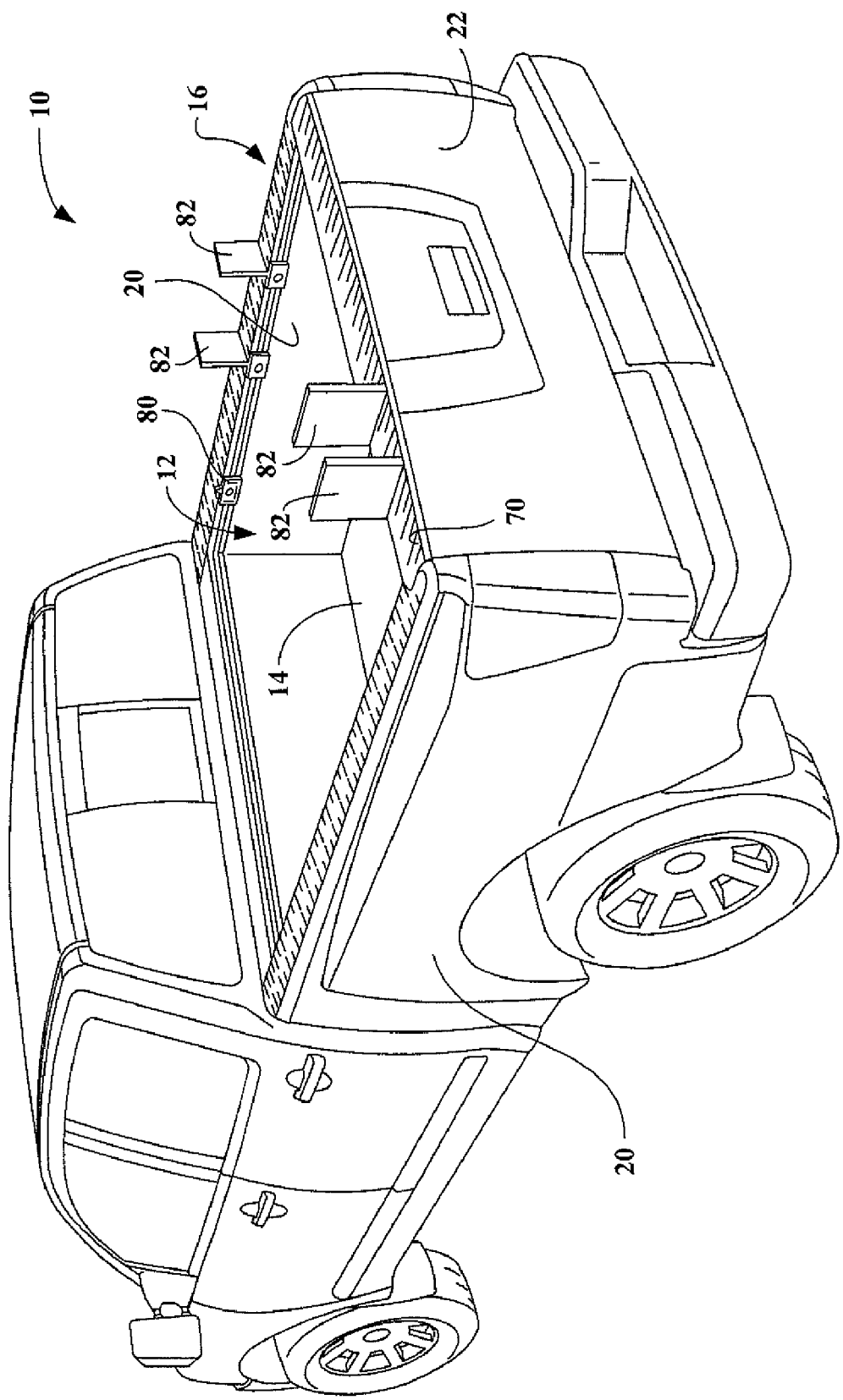
FIG. 1 is a perspective view of a vehicle having a cargo bed showing portions of the cargo bed provided scalar demarcations in accordance with a first embodiment of the present invention.

Referring initially to FIG. 1, a vehicle 10 having a cargo bed 12 is illustrated in accordance with a first embodiment of the present invention. Key surfaces of the cargo bed 12 are provided with ruler-like measurement markings or scalar demarcations that serve as a fixed measuring system similar to a yardstick or tape measure, as described in greater detail below.

Figure 2:
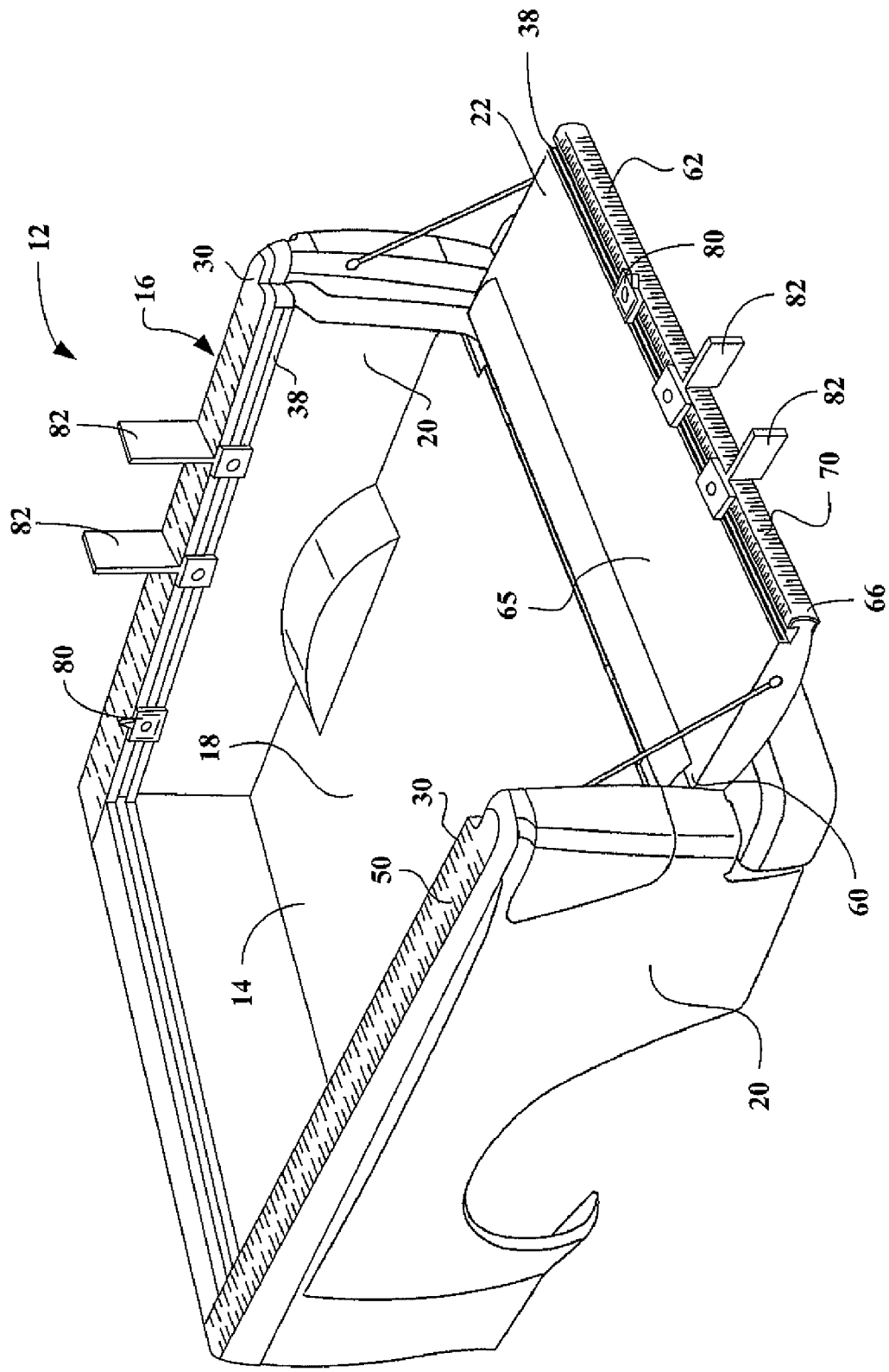
FIG. 2 is a perspective view of the cargo bed removed from the vehicle showing side walls and a tailgate with the scalar demarcations, with the tailgate in a horizontal or open orientation, further showing a marker cleat and pairs of cargo movement restricting members installed on the side walls and the tailgate in accordance with the first embodiment of the present invention.

As shown in FIGS. 1 and 2, the cargo bed 12 basically includes a cargo bed floor 14 and a wall structure 16. The cargo bed floor 14 has an approximately horizontal cargo bed surface 18. The wall structure 16 at least partially surrounds the cargo bed surface 18. The wall structure 16 includes a pair of side walls 20 and a tailgate 22 supported at a rearward end of the cargo bed 12 between the side walls 20. The side walls 20 and the tailgate 22 are preferably made of a metal material, such as steel and sheet metal materials, but can alternatively be made of plastic, polymer and/or composite materials.

The side walls 20 are symmetrical to one another but are otherwise identical extending along longitudinal sides of the cargo bed floor 14. Each of the side walls 20 extends vertically upward from the cargo bed floor 14 and is preferably integrally manufactured with, fastened to or welded to the cargo bed floor 14 in a conventional manner. Specifically, each of the side walls 20 defines a portion of the wall structure that extends upward from the cargo bed floor 14. Each of the side walls 20 extends the longitudinal length of the cargo bed floor 14 at opposite sides of the cargo bed floor 14. Since the side walls 20 are otherwise identical to one another, description of one of the side walls 20 applies to both of the side walls 20. Therefore, only one of the side walls 20 is described in great detail for the sake of brevity.

Figure 4:
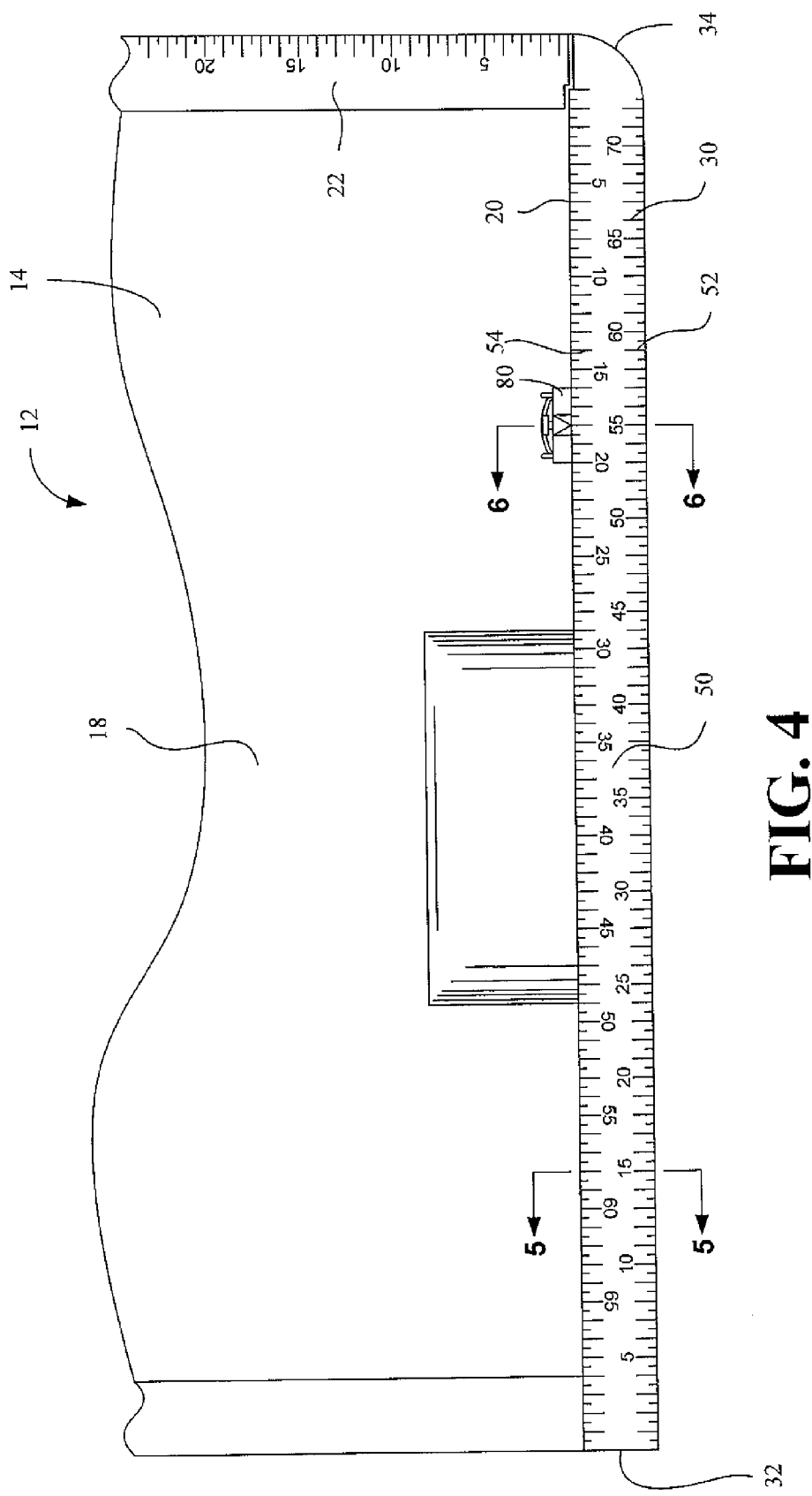
FIG. 4 is a top plan view of one of the side walls of the cargo bed showing two separate sets of scalar demarcations on one of the side walls with one of the marker cleats installed on the side wall in accordance with the first embodiment of the present invention.

As best shown in FIGS. 4-9, the side wall 20 includes an upper end 26 (FIGS. 5-8), an approximately vertical inner surface 28 (FIGS. 6-9), an attachment member 30, a front end 32 (FIG. 4) and a rear end 34 (FIG. 4). The upper end 26 preferably has a generally flat profile with an approximately horizontal surface that is provided with a plurality of apertures 36, as shown in FIG. 5 (only two apertures 36 is shown).

The inner surface 28 (a second surface) extends in a direction approximately perpendicular to the upper end 26 and approximately perpendicular to the cargo bed floor 14. The inner surface 28 includes a recess that receives an attachment track or utility track 38 (FIGS. 5-9). The utility track 38 extends along the inner surface 28 (within the recess) adjacent to the upper end 26 and approximately parallel to both the upper end 26 and the cargo bed floor 14. The utility track 38 is configured to receive and support any of a variety of attachments, as described in greater detail below. Each utility track 38 includes an open, elongated channel or recess 40, and two confronting elongated projections 42. An elongated gap 44 is defined between the projections 42 exposing the recess 40, as shown in FIGS. 5-9.

As best shown in FIGS. 4-9, the attachment member 30 is a protective element that is preferably made of a durable, resilient material such as a rubber, plastic material or a polymer material. The attachment member 30 is provided on the upper end 26 of the side wall 20 to protect the side wall 20 against damage when resting heavy objects on the side wall 20 or by movement of heavy cargo over the side wall 20. For example, a person moving a heavy piece of equipment or heavy material from the cargo bed 12 might rest that equipment or material on the side wall 20, scratching or marring the finish on the metal of the side wall 20. However, with the inclusion of the attachment member 30, such damage is minimized or eliminated. In the event that the attachment member 30 is damaged, the attachment member 30 can easily be replaced without tremendous cost. A separate attachment member 30 is provided for each of the upper ends 26 of the two side walls 20. The attachment members 30 are symmetrical, like the side walls 20, but are otherwise identical. Therefore, only one attachment member 30 is described for the sake of brevity.

As shown in FIG. 5, the attachment member 30 is secured to the upper end 26 of the wall structure 16 by a plurality of attachment projections 48 (only one attachment projection 48 is shown in FIGS. 5 and 6). The plurality of projections 48 are configured to insert into corresponding apertures 36 in the upper end 26 of the side wall 20. Although only one projection 48 is shown in FIGS. 5 and 6, it should be understood from the drawings and description herein that a plurality of corresponding apertures 36 and projections 48 can be formed with the side wall 20 and the attachment member 30. The apertures 36 and projections 48 are spaced apart from one another in order to adequately secure the attachment member 30 in position. Further, the projections 48 can have any of a variety of shapes and sizes. One such shape for each of the projections 48 is an inverted Christmas-Tree shape, or conical shape where a conical end of each of the projections 48 is inserted into a corresponding one of the apertures 36. A reduced diameter portion of each projection 48 defines an engagement surface that retains the projection 48 within the aperture 36.

It should be understood that the projections 48 and apertures 36 provide one example of a configuration for securing the attachment member 30 to the upper end 26 of the side wall 20. Many different conventional attachment configurations can be employed with the present invention. For example, mechanical fasteners and/or adhesive material can also be used to secure the attachment member 30 to the upper end 26 of the side wall 20. Further, the projections 48 can have any of a variety of shapes and configurations that secure the attachment member 30 to the upper end 26 of the side wall 20.

As shown in FIGS. 4-6, 8 and 9, an approximately horizontal first surface 50 is defined on an upper surface of the attachment member 30. The first surface 50 can have a slight curvature to it, but overall, the first surface 50 is approximately horizontal. The first surface 50 is disposed above the cargo bed surface 18, as indicated in FIG. 2. The attachment member 30 is dimensioned to completely cover the upper end 26 of the side wall 20. However, the attachment member 30 can alternatively be dimensioned and configured differently. Specifically, the attachment member 30 can alternatively be shaped and dimensioned to cover the majority (but not all) or only a portion of the upper end 26 of the side wall 20.

As shown in FIGS. 5, 6 and 9, the inner surface 28 of the wall is oriented such that the inner surface 28 extends in a direction approximately perpendicular to the first surface 50. Similarly, the utility track 38 extends along the inner surface 28 adjacent to and approximately parallel to the first surface 50.

As best shown in FIG. 4, the first surface 50 includes linearly extending first scalar demarcations 52 and a second scalar demarcations 54 formed thereon. The first and second scalar demarcations 52 and 54 (and other scalar demarcations described below) are provided as fixed rulers or fixed measuring sticks for use in measuring materials hauled in the cargo bed 12 or used near the vehicle 10. It should be understood from the drawings and the description herein that the first surface 50 can be formed as a flat, planar surface. However, in the depicted embodiment, the first surface 50 is generally flat with curved edges. Therefore, as shown in FIGS. 7 and 8, ends of the lines which make up the scalar demarcations 52 are slightly visible from the side.

The first and second scalar demarcations 52 and 54 are preferably formed as embossments or raised areas of the first surface 50 of the attachment member 30. The attachment members 30 are preferably formed in a molding process and the first and second scalar demarcations 52 and 54 formed in the mold itself (not shown). Additionally, the raised surfaces of the first and second scalar demarcations 52 and 54 can be applied with ink or other distinguishing materials to make the first and second scalar demarcations 52 and 54 more visible and prominent. Alternatively, the first and second scalar demarcations 52 and 54 can be printed onto the surface of the attachment members 30. Further, the first and second scalar demarcations 52 and 54 can alternatively be formed as depressions in the first surface 50 of the attachment member 30, instead of being raised areas of the first surface 50.

The attachment member 30, the first surface 50, the first scalar demarcations 52 and the second scalar demarcations 54 preferably extend approximately the entire length of the side wall 20, but can alternatively only extend a portion of the length of the side wall 20. Both the first and second scalar demarcations 52 and 54 are graduated measurement lines that can optionally include numeric indicia (shown in FIG. 4 only) indicating a scale of measurement. For example, numeric indicia of both the first and second scalar demarcations 52 and 54 can be graduated in either metric (SI measurement system) or British Units (inches/feet/miles). Alternatively, one of the first and second scalar demarcations 52 and 54 can be in metric units and the other can be British Units. Still further, in an alternate embodiment, only one of the first and second scalar demarcations 52 and 54 need be provided on the attachment member 30.

As best shown in FIG. 4, the first scalar demarcations 52 are preferably located toward a laterally outward edge of the first surface 50. Preferably, the numeric indicia of the first scalar demarcations 52 start at the front end 32 of the side wall 20 and extend (with increasing increments) to the rear end 34 of the side wall 20. The second scalar demarcations 54 are preferably located toward a laterally inward edge of the first surface 50. The numeric indicia of the second scalar demarcations 54 preferably starts at the rear end 34 of the side wall 20 and extends (with increasing increments) to the front end 32 of the side wall 20. It should be understood from the drawings and the description herein that the first and second scalar demarcations 52 and 54 can alternatively be reversed such that the first scalar demarcations 52 is located on a laterally inward edge of the first surface 50 and the second scalar demarcations 54 is located on a laterally outward edge of the first surface 50.

As best shown in FIGS. 1-4, the tailgate 22 is also a portion of the wall structure 16 and at least partially surrounds the cargo bed floor 14. The tailgate 22 is pivotally supported in a conventional manner relative to the cargo bed floor 14 between the rear ends 34 of the side walls 20 for movement between an approximately vertical orientation (FIG. 1) and an approximately horizontal orientation (FIG. 2).

Figure 3:
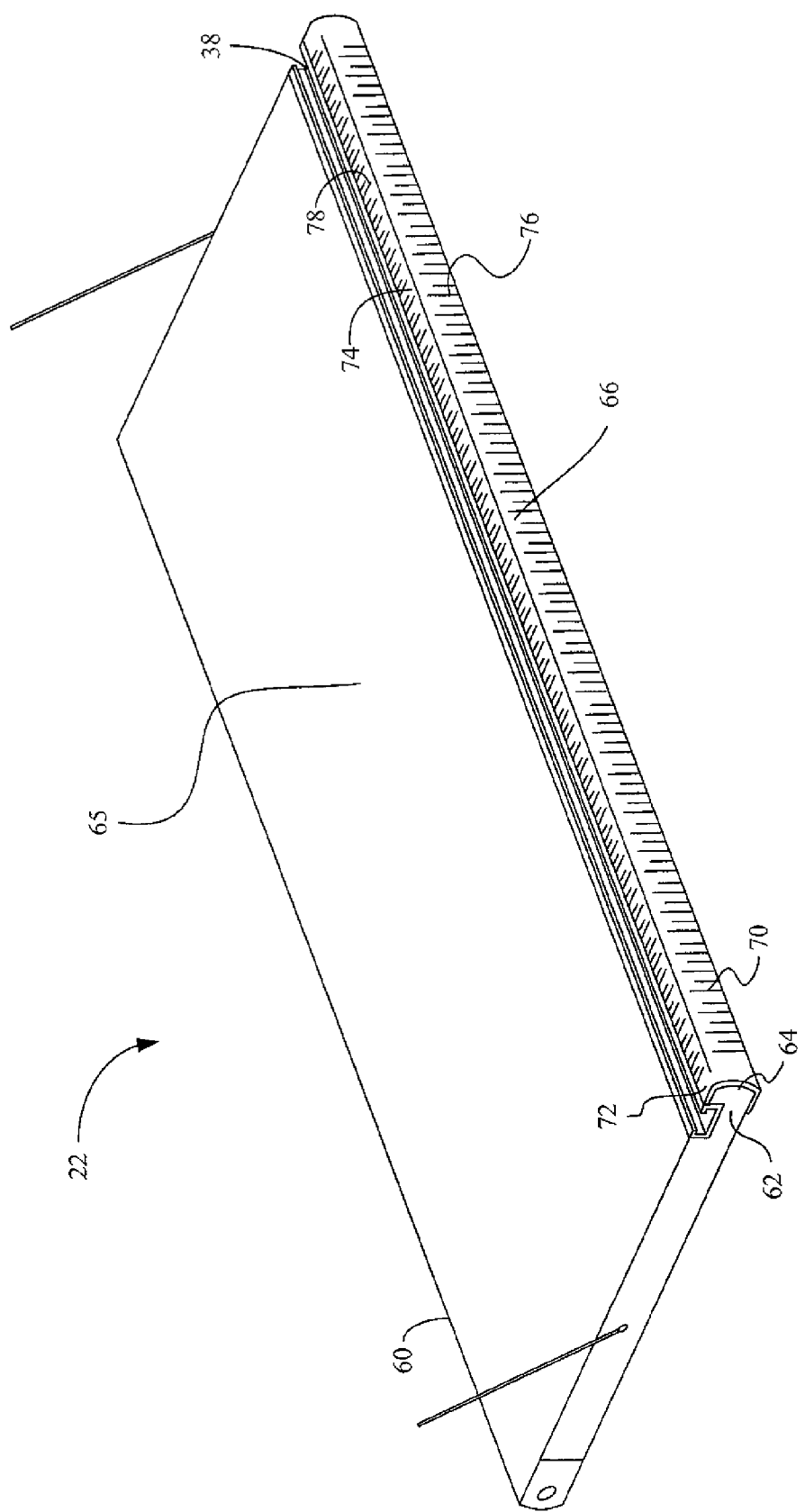
FIG. 3 is a perspective view of the tailgate separated from the cargo bed with the marker cleat and the cargo movement restricting members removed showing scalar demarcations on two separate surfaces of the tailgate approximately perpendicular to one another in accordance with the first embodiment of the present invention.

As best shown in FIGS. 2 and 3, the tailgate 22 further includes a hinged end 60, a distal end 62 that includes an approximately flat end surface 64 (FIGS. 3 and 10), a tailgate inner surface 65 and a tailgate outer surface 65a. The end surface 64 is approximately parallel to the cargo bed surface 18 with the tailgate in the vertical orientation (FIG. 1) and approximately perpendicular to the cargo bed surface 18 with the tailgate 22 in the horizontal orientation (FIG. 2). The end surface 64 further defines an upper end having an approximately horizontal surface such that the tailgate inner surface 65 and the tailgate outer surface 65a define opposing side surfaces (FIG. 10) that extend downward from opposite sides of the end surface 64 (the upper end), with the tailgate 22 in the closed or vertical orientation, as shown in FIGS. 1 and 10.

The tailgate inner surface 65 extends between the hinged end 60 and the distal end 62 of the tailgate 22 and faces the cargo bed 12 with the tailgate 22 in the vertical orientation as shown in FIG. 1. The majority of the tailgate inner surface 65 is planar and extends the cargo bed floor 14 with the tailgate 22 in the horizontal orientation shown in FIG. 2. The tailgate inner surface 65 is approximately perpendicular to the cargo bed floor 14 with the tailgate 22 in the vertical orientation shown in FIG. 1.

The tailgate inner surface 65 includes a recess with one of the utility tracks 38 mounted therein. The utility track 38 in the recess of the tailgate inner surface 65 extends in a direction that is generally parallel to the end surface 64 of the tailgate 22. Since the utility track 38 on the tailgate inner surface 65 is identical to the utility track 38 in the side walls 20, further description of the utility track 38 is omitted for the sake of brevity. Specifically, description of one utility track 38 applies equally to all of the utility tracks 38 included in the cargo bed 12 of the present invention.

Figure 10:
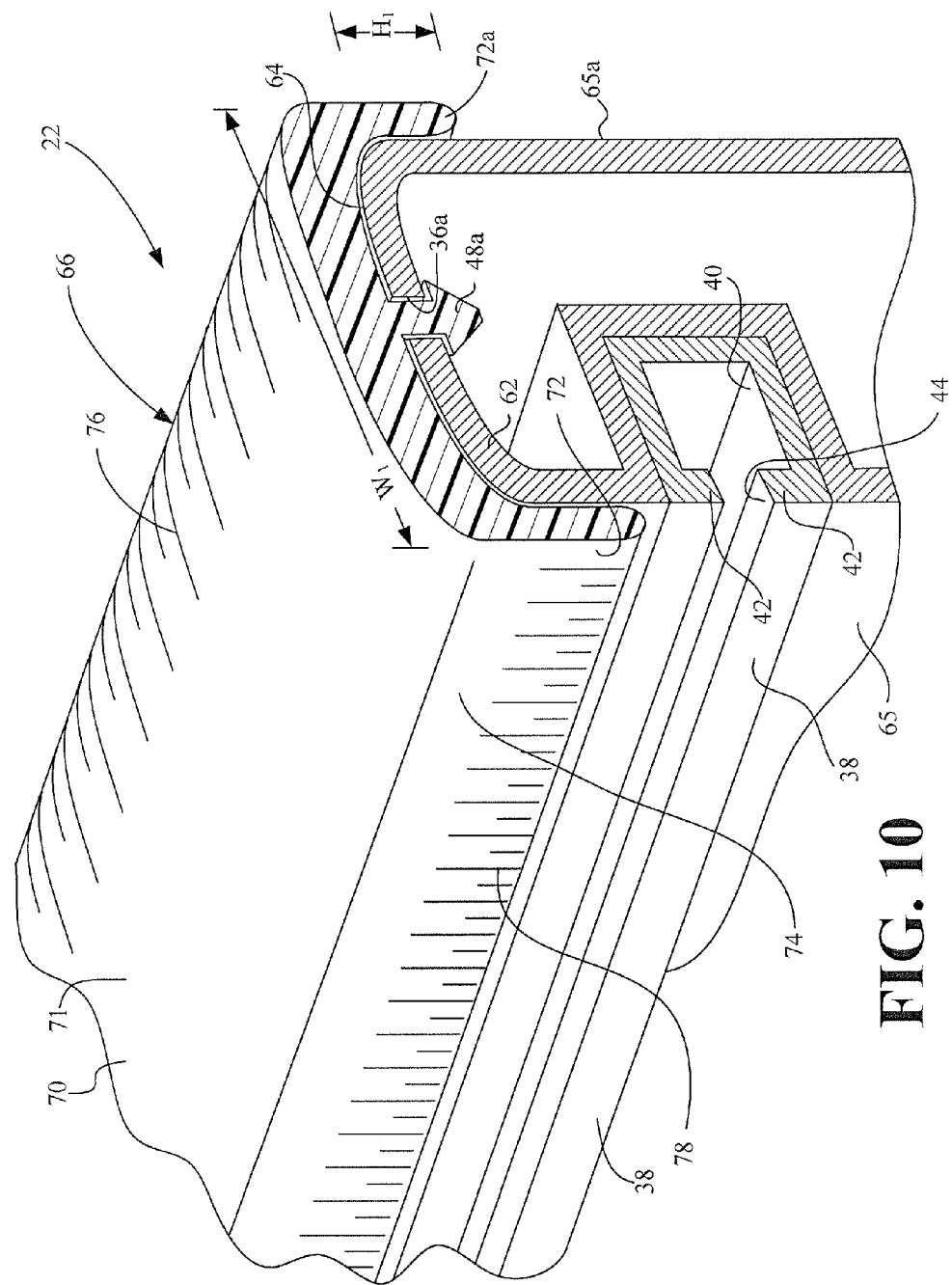
FIG. 10 is a perspective cross-sectional view of a portion of the tailgate with the marker cleat and the cargo movement restricting members removed showing the differing scalar demarcations on the two separate surfaces of the tailgate approximately perpendicular to one another in accordance with the first embodiment of the present invention.

As best shown in FIGS. 2, 3 and 10, the tailgate 22 includes a tailgate attachment member 66 that has features similar to the attachment member 30 of the side walls 20. The tailgate attachment member 66 is preferably made from a durable, resilient material such as a rubber material, a plastic material or polymer material. The tailgate attachment member 66 is secured to the end surface 64 of the distal end 62 of the tailgate 22 in a manner similar to or the same as the attachment between the attachment member 30 and the side wall 20. The tailgate attachment member 66 is secured to the end surface 64 of the distal end 62 of the tailgate 22. Specifically, the tailgate attachment member 66 includes projections 48a that are inserted into corresponding apertures 36a in the distal end 62 of the tailgate 22.

As shown in FIG. 10, with the tailgate in the closed or vertical orientation, the tailgate attachment member 66 further includes a main section 71 having a width $W_1$ and a pair of side extensions 72 and 72a having a height $H_1$. The side extension 72 extends from the end surface 70 of the main section 71 along a portion of the tailgate inner surface 65 adjacent the utility track 38. The side extension 72a extends along a portion of the tailgate outer surface 65a. The side extension 72 (a side portion) defines an extension surface 74. The extension surface 74 and the end surface 70 overall are approximately perpendicular to one another. The side extension 72 and the side extension 72a are approximately parallel to one another, as shown in FIG. 10. Further, the side extensions 72 and 72a extend downward along the tailgate inner surface 65 and the tailgate outer surface 65a (respective opposing side surfaces) of the tailgate 22 a distance (the height $H_1$) that is less than the width $W_1$ of the main section 71.

As shown in FIGS. 3 and 10, the tailgate attachment member 66 farther includes side extension 72 that extends from the end surface 70 along a portion of the tailgate inner surface 65 adjacent the utility track 38. The side extension 72 (a side portion) defines an extension surface 74. The extension surface 74 and the end surface 70 overall are approximately perpendicular to one another.

The end surface 70 is provided with linearly extending third scalar demarcations 76 on the tailgate end surface 70. The extension surface 74 is provided with linearly extending fourth scalar demarcations 78. Hence, the fourth scalar demarcations 78 extends along and parallel to the utility track 38 of the tailgate 22.

The third and fourth scalar demarcations 76 and 78 are preferably formed as embossments or raised areas of the surfaces 70 and 74 of the attachment member 66. The attachment member 66 is preferably formed in a molding process in a manner similar to the attachment member 30. Additionally, the raised surfaces of the third and fourth scalar demarcations 76 and 78 can be applied with ink or other distinguishing materials to make the third and fourth scalar demarcations 76 and 78 more visible. Alternatively, the third and fourth scalar demarcations 76 and 78 can be printed onto the surfaces of the attachment members 66. Further, the third and fourth scalar demarcations 76 and 78 can alternatively be formed as depressions in the surfaces 70 and 74 of the attachment member 66, instead of being raised areas.

The present invention further includes accessories that take advantage of the proximity of the utility tracks 38 and one or more of the first, second, third and fourth scalar demarcations 52, 54, 76 and 78. Specifically, the present invention includes one or more distance marking cleats 80 shown in FIGS. 1, 2, 4, 6, 7, 11 and 12, and a pair of cargo movement restricting members 82 shown in FIGS. 1, 2, 8, 9, 11 and 13.

As shown in FIGS. 1, 2, 4, 6, 7 and 1, the cleat 80 can be installed on either or both of the side wall 20 and/or the tailgate 22. The cleat 80 is configured to provide a mechanism for marking a specific point on any one of the first, second, third and fourth scalar demarcations 52, 54, 76 and 78 and referencing that point again and again. For example, the cleat 80 can be manually positioned at a specific distance indicated by one of the first, second, third and fourth scalar demarcations 52, 54, 76 and 78. Once the cleat 80 is positioned, materials can be measured against the marked reference point.

As best shown in FIGS. 6, 7, 11 and 12, the cleat 80 basically includes a block portion 84, tie-down hooks 86, a positioning knob 88, an attachment bolt 90 (FIG. 6 only) and a pointer 92. The tie-down hooks 86 are provided so that cargo within the cargo bed 12 can be secured in place by rope (not shown) or other tie-down means such as bungee cords. The attachment bolt 90 includes a head portion 94 that is wider than the remainder of the attachment bolt 90. As shown best in FIG. 6, the head portion 94 is dimensioned to slide within the recess 40 of the utility track 38 and is larger than the gap 44 defined between the projections 42. Since the head portion 94 is larger than the gap 44, the head portion 94 contacts both of the projections 42 of the utility track 38. The remainder of the attachment bolt 90 is threaded and is dimensioned to easily extend between the projections 42 and the gap 44 of the utility track 38. The attachment bolt 90 is inserted into an aperture within the block portion 84 of the cleat 80 such that the attachment bolt 90 extends out of the block portion 84. The positioning knob 88 includes a threaded bore into which the exposed portion of the attachment bolt 90 is threaded.

The positioning knob 88 is loosened in order to move the cleat 80. The cleat 80 can then slide along the utility track 38 such that the pointer 92 is moved to a desired position or distance along one of the first, second, third and fourth scalar demarcations 52, 54, 76 and 78. Once in position, the positioning knob 88 is tightened thereby locking the cleat 80 and the pointer 92 in position. When the positioning knob 88 is loosened, the cleat 80 can easily slide along the length of the utility track 38 for easy and simple positioning.

It should be understood from the drawings and description herein that the cleat 80 can be easily removed from any of the utility tracks 38 on the side walls 20 or the tailgate 22. In order to remove the cleat 80, the positioning knob 88 is loosened and the cleat 80 is slid to the rear end of the side wall 20 or to either side of the tailgate 22. The utility tracks 38 have open ends such that the head portion 94 of the attachment bolt 90 can slide out of the utility track 38. The cleat 80 can easily be reinstalled into any of the utility tracks 38 by reversing the removal process.

Consequently, the cleat 80 can be moved between either one of the side walls 20 or the tailgate 22. In the drawings, several cleats 80 are depicted. The vehicle 10 can be provided with one cleat 80 or several cleats 80, as indicated in the drawings.

The cargo movement restricting members 82 shown in FIGS. 1, 2, 8, 9, 11 and 13 are all identical. Therefore description of one of the cargo movement restricting members 82 applies to all. The cargo movement restricting member 82 basically includes a mounting portion 96 and an upright portion 98. The mounting portion 96 includes the positioning knob 88 and attachment bolt 90. Since the positioning knob 88 and the attachment bolt 90 operate in a manner identical to those of the cleat 80, description is omitted for the sake of brevity. The upright portion 98 extends upward from the mounting portion 96 and includes cargo contacting surface on either side thereof.

As shown in FIGS. 1, 2, 8 and 9, when the cargo movement restricting member 82 is installed on the side wall 20, the upright portion 98 creates an approximately vertical wall that extends from the first surface 50. When two of the cargo movement restricting members 82 are installed on the side wall 20, the upright portions 98 create parallel vertical walls that limit movement of cargo placed between the two adjacent upright portion 98, as indicated in FIGS. 1, 2 and 8. The cargo movement restricting members 82 can be positioned anywhere along the longitudinal length of the side walls 20 in order to secure cargo placed in the cargo bed 12. By loosening the positioning knob 88, the cargo movement restricting members 82 can be positioned as strategic locations using the first and second scalar demarcations 52 and 54.

Figure 11:
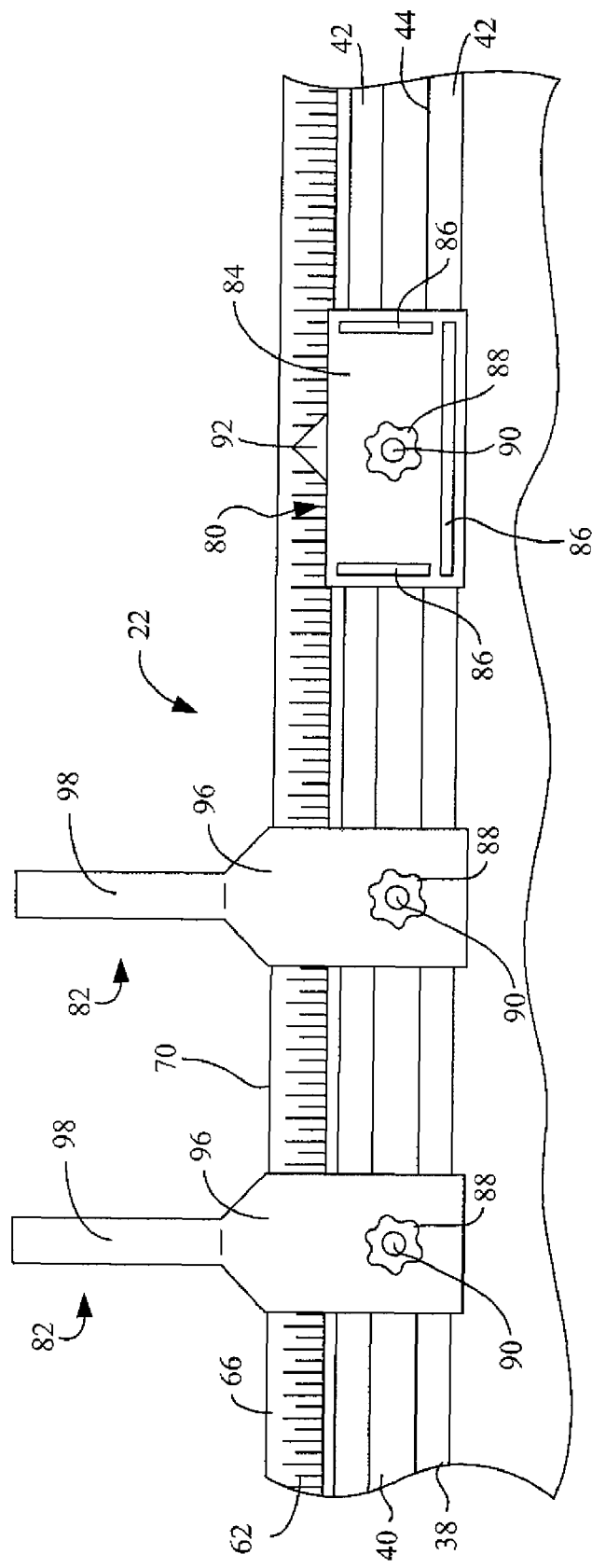
FIG. 11 is a side elevational view of the tailgate showing the marker cleat and the cargo movement restricting members installed thereon in accordance with the first embodiment of the present invention.
Figure 13:
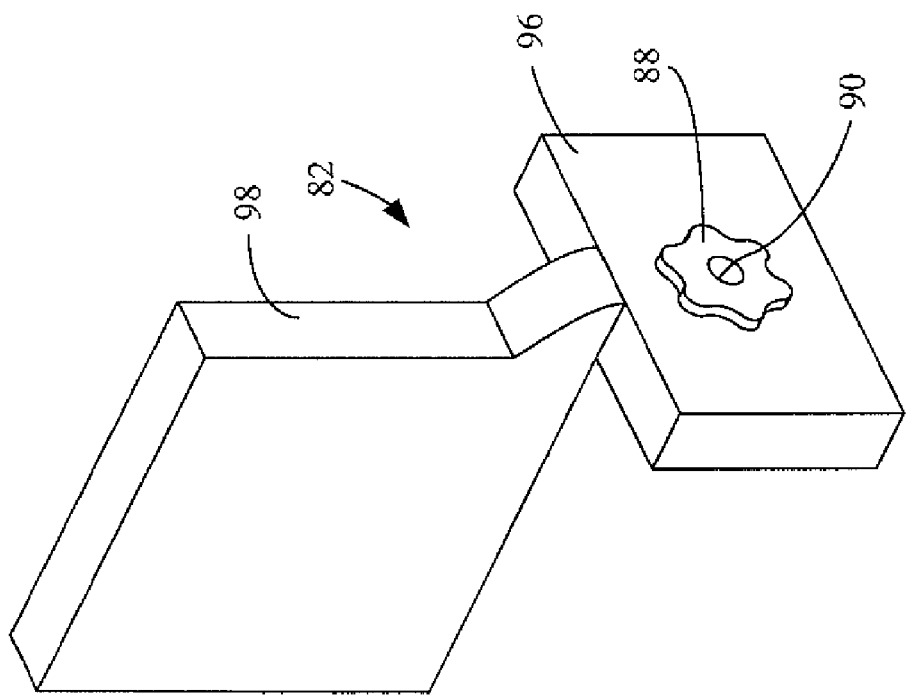
FIG. 13 is a perspective view of one of the cargo movement restricting members shown removed from the cargo bed in accordance with the first embodiment of the present invention.
Figure 12:
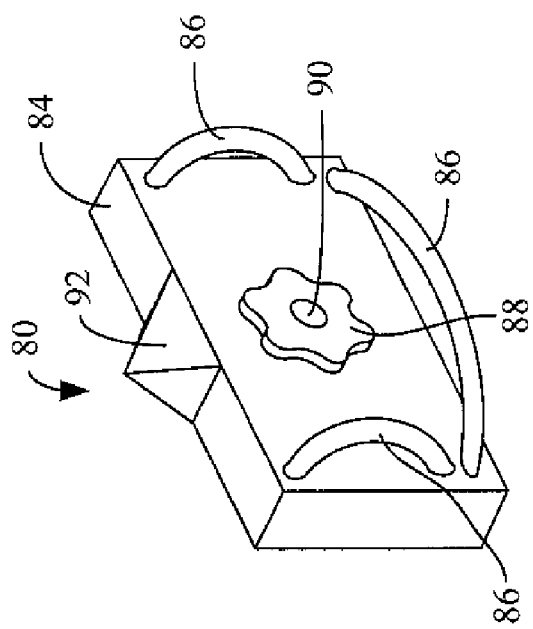
FIG. 12 is a perspective view of the marker cleat shown removed from the cargo bed in accordance with the first embodiment of the present invention.

In a similar manner, one, two or several of the cargo movement restricting members 82 can be installed on the tailgate 22, as shown in FIGS. 1, 2 and 11. When two of the cargo movement restricting members 82 are installed on the tailgate 22, the upright portions 98 create parallel vertical walls that limit movement of cargo placed between the two adjacent upright portion 98. The cargo movement restricting members 82 can be positioned anywhere along the length of the tailgate 22 in order to secure cargo placed in the cargo bed 12. By loosening the positioning knob 88, the cargo movement restricting members 82 can be positioned as strategic locations using the third and fourth scalar demarcations 76 and 78.

Hence, a pair of the cargo movement restricting members 82 can be installed to the utility track 38 of the tailgate 22 and/or one or both of the utility tracks 38 of the side walls 20 for selective movement along the corresponding utility track 38.

As mentioned above the first, second, third and fourth scalar demarcations 52, 54, 76 and 78 each provide a reliable way of measuring objects or cargo. Since the first second and third scalar demarcations 52, 54 and 76 are provided on raised surfaces above the cargo bed surface 18, observing distances and lengths of objects is made easier. The raw material merely needs to be placed on either of the side walls 20 on top of the attachment member 30 or on top of the tailgate 22 in the vertical orientation and the tailgate attachment member 66. The raw material can then be measured.

With the tailgate 22 in the horizontal orientation, objects or materials can be laid on the tailgate 22 and appropriate measurements made using the fourth scalar demarcations 78.

Second Embodiment

Figure 16:
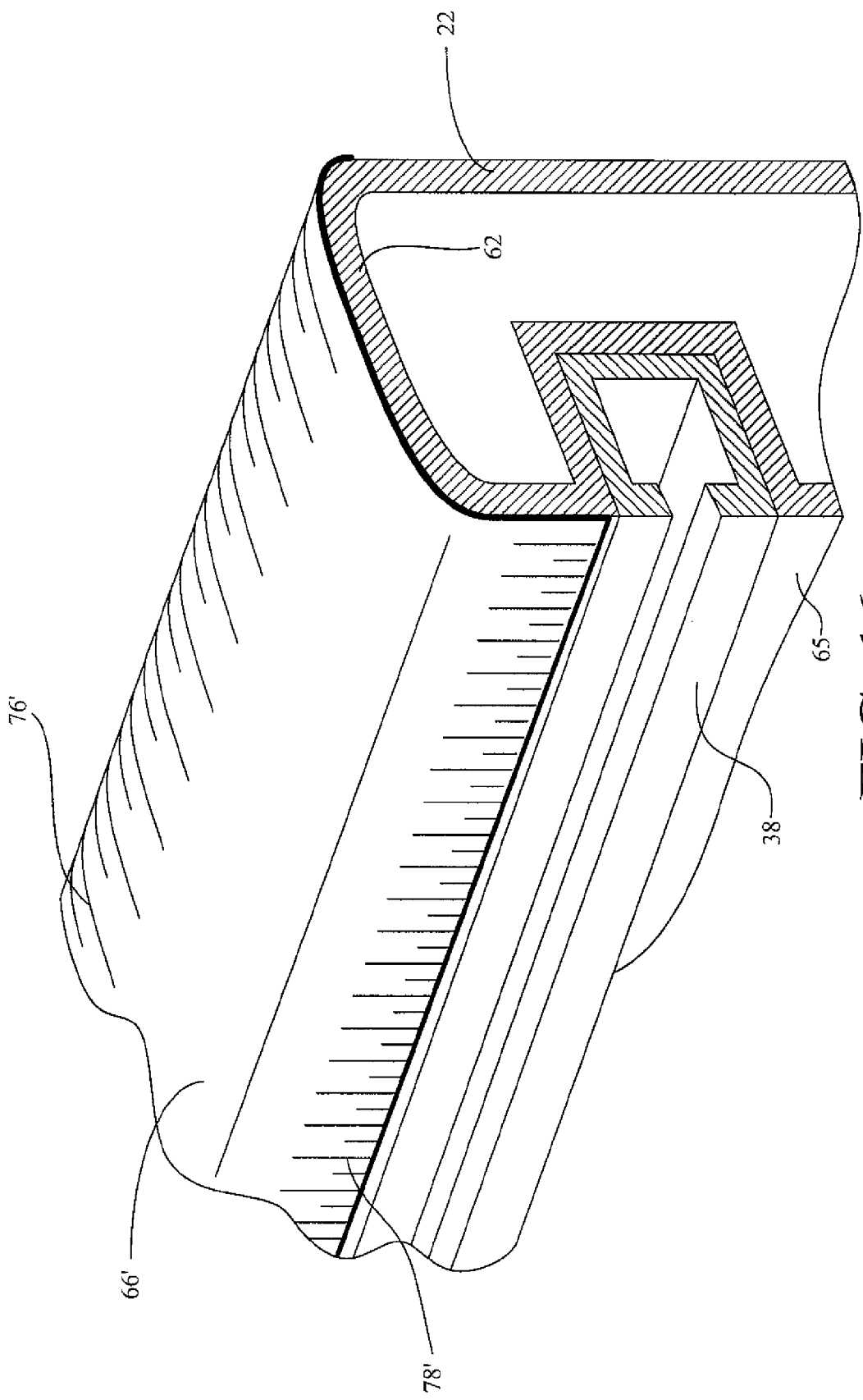
FIG. 16 is a perspective cross-sectional view of a portion of a tailgate showing a decal with two sets of scalar demarcations in accordance with the second embodiment of the present invention.
Figure 18:
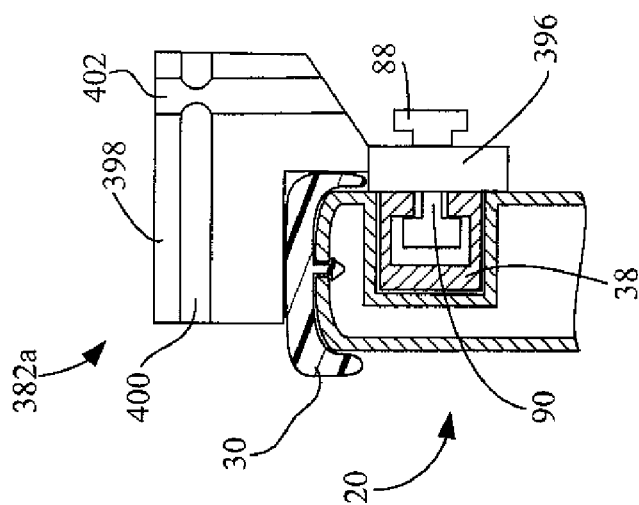
FIG. 18 is a cross-sectional end view of a portion of the cargo bed of the vehicle similar to FIG. 9, showing one of the two cargo movement restricting members mounted to the side wall of the vehicle in accordance with the third embodiment of the present invention.
Figure 17:
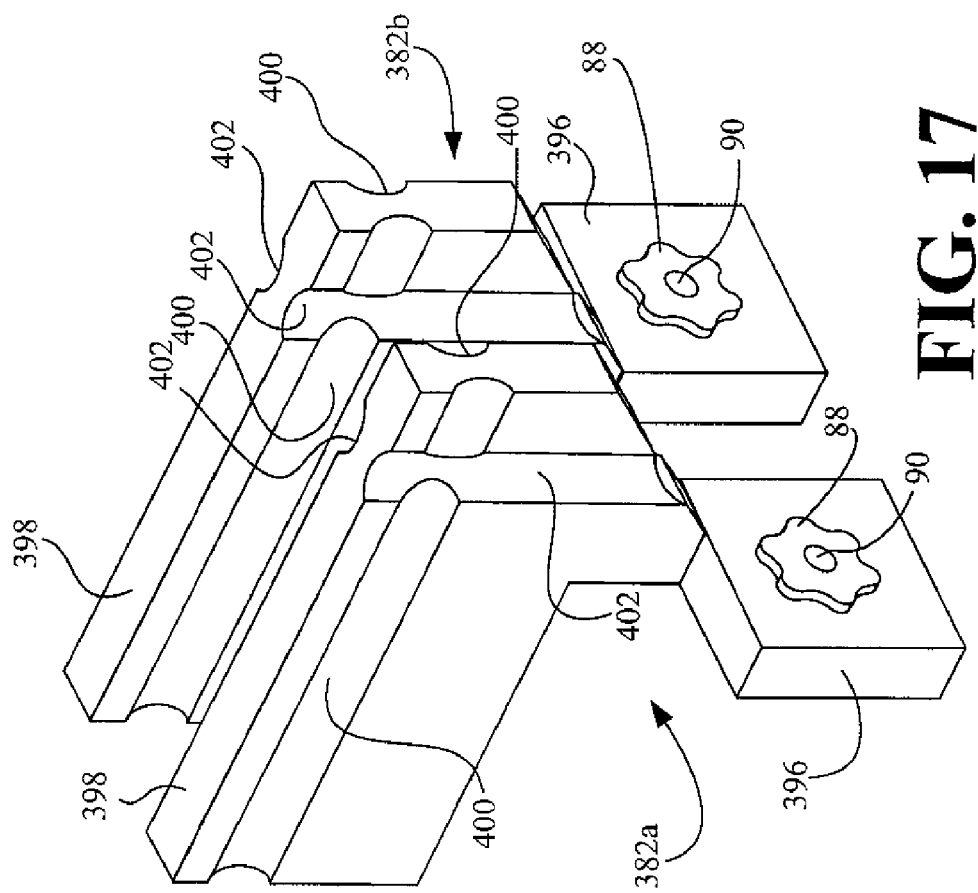
FIG. 17 is a perspective view of two cargo movement restricting members shown removed from the cargo bed in accordance with a third first embodiment of the present invention.

Referring now to FIGS. 14, 15 and 16, portions of a cargo bed in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a prime (').

In the second embodiment, the cargo bed is basically identical to the cargo bed 12 of the first embodiment except that the side walls 20 have been replaced with side walls 20'. The tailgate 22 is unchanged in the second embodiment, but can alternatively be modified in a manner similar to the side walls 20'.

Further, in the second embodiment the attachment member 30 is replaced with a side wall decal 30' and the tailgate attachment member 66 is replaced with a tailgate decal 66'. The side wall decal 30' and the tailgate decal 66' are attachment members, but they are significantly thinner than the attachment member 30 and the tailgate attachment member 66 and are fixed differently to the side walls 20' and tailgate 22.

As indicated in FIG. 14, the side wall 20' includes an embossment or projection 100 that extends along the longitudinal length of the side wall 20'. The projection 100 provides vertical protection for the decal 30' along an inboard side of the side wall 20'. However, alternatively, the projection 100 can be formed on an outboard side of the side wall 20'. In a preferred embodiment, the projection 100 extends upward from the surface of the side wall 20' a distance approximately equal to or slightly greater than the thickness of the decal 30'. The inclusion of the projection 100 on the side wall 20' has no effect on the function or utility of the utility track 38.

The decal 30' includes first and second scalar demarcations 52' and 54' that are similar to the first and second scalar demarcations 52 and 54 of the first embodiment. The decal 30' is configured to attach to the side wall 20. The decal 30' is preferably provided with adhesive on an underside thereof and fixed to the side wall 20 by the adhesive, as shown in FIG. 15.

The first and second scalar demarcations 52' and 54' are preferably formed as embossments or raised areas of the decal 30'. The raised surfaces of the first and second scalar demarcations 52' and 54' can be applied with ink or other distinguishing materials to make the first and second scalar demarcations 52' and 54' more visible and prominent. Alternatively, the first and second scalar demarcations 52' and 54' can be printed onto the surface of the decal 30'. Further, the first and second scalar demarcations 52' and 54' can alternatively be formed as depressions or concaved lines in the decal 30', instead of being raised areas of the decal 30'. Preferably, the decal 30' is mounted to the upper surface of the side wall 20' along side the projection 100, but does not extend over the projection 100.

As shown in FIG. 16, the tailgate decal 66' is provided with third and fourth scalar demarcations 76' and 78'. The third and fourth scalar demarcations 76' and 78' are preferably formed as embossments or raised areas, but can also printed onto the tailgate decal 66'. The third and fourth scalar demarcations 76' and 78' can also be formed as recesses or concaved lines on the tailgate decal 66'. The tailgate decal 66' is preferably fixed to both the distal end 62 and the tailgate inner surface 65 by adhesive such that the fourth scalar demarcation 78' extends along the utility track 38 of the tailgate 22.

It should be understood from the drawings and description herein that the Tailgate 22 can alternatively be formed such that an outboard or rearward side of the tailgate 22 includes a protective projection (not shown) similar to the projection 100 of the side wall 20'.

The cleat 80 and the cargo movement restricting members 82 can be attached to the utility tracks 38 at either of the side walls 20 or the tailgate 22 in a manner the same as that described above with respect to the first embodiment.

Third Embodiment

Referring now to FIGS. 17-20, cargo movement restricting members 382a and 382b are depicted in accordance with a third embodiment of the present invention. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The cargo movement restricting members 382a and 382b of the third embodiment can be used with the cargo bed 12 and installed in any of the utility tracks 38 described above with respect to the first and second embodiments.

Each of the cargo movement restricting members 382a and 382b includes a mounting portion 396 and an upright portion 398. The mounting portion 396 includes the position knob 88 and the attachment bolt 90, the same as described above with respect to the movement restricting members 82 of the first and second embodiments. However, the mounting portions 396 of the cargo movement restricting members 382a and 382b differ from the mounting portions 96 of the first and second embodiment. Specifically, the mounting portions 396 of the cargo movement restricting members 382a and 382b are offset or off-center relative to the upright portion 398, as best shown in FIG. 19.

The upright portion 398 differs from the upright portion 98 of the cargo movement restricting members 82 of the first and second embodiments. Specifically, the upright portion 398 extends inboard relative to the positioning knob 88, as shown in FIG. 19. More specifically, the upright portion 398 extends further inboard from the side wall 20 than the positioning knob 88. Further as shown FIGS. 17 and 18, both upright sides (the cargo contacting surfaces) of the upright portion 398 each include a horizontal recess 400 and a vertical recess 402.

Figure 20:
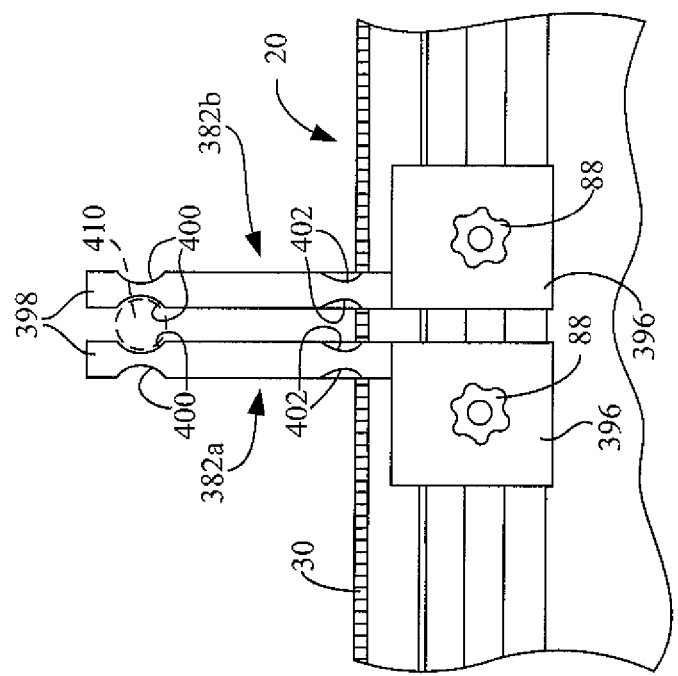
FIG. 20 is a side elevational view of the portion of the cargo bed depicted in FIG. 18, showing the two cargo movement restricting members mounted to the side wall of the vehicle in accordance with the third embodiment of the present invention.
Figure 19:
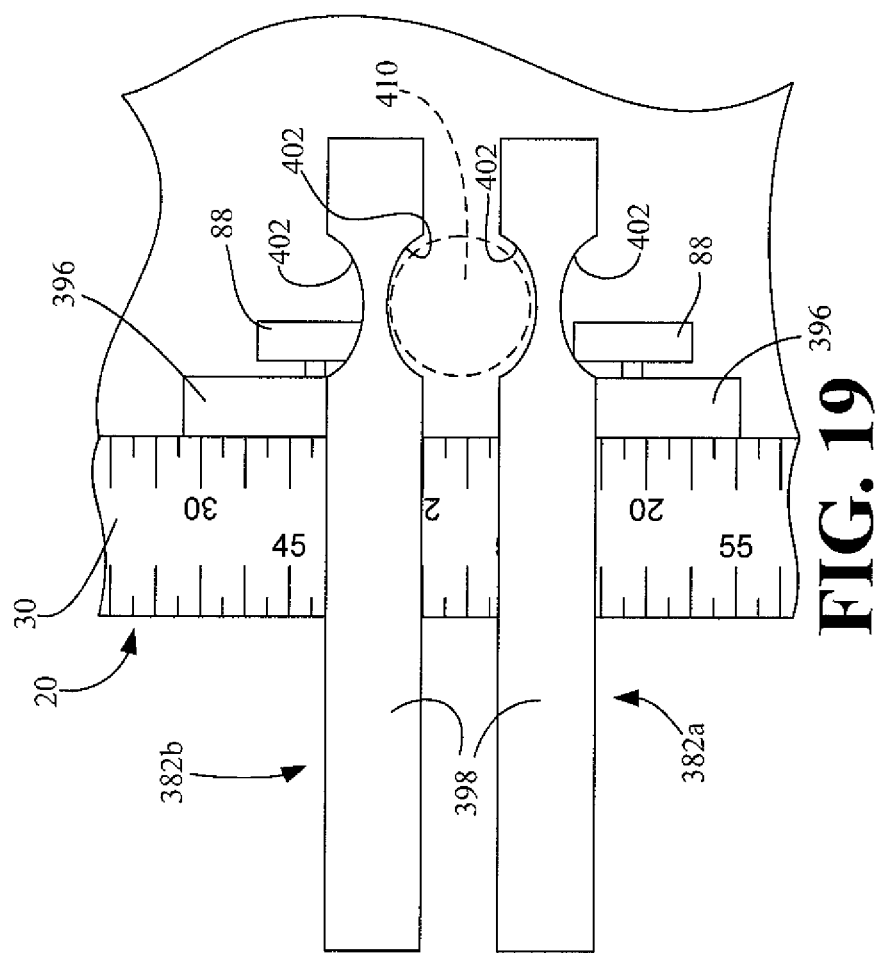
FIG. 19 is a top plan view of the portion of the cargo bed depicted in FIG. 18, showing the two cargo movement restricting members mounted to the side wall of the vehicle in accordance with the third embodiment of the present invention.

The horizontal recess 400 and a vertical recess 402 intersect and are configured such that when the two cargo movement restricting members 382a and 382b are positioned adjacent to one another, adjacent ones of either the horizontal recesses 400 or the vertical recesses 402 can retain a tool 410, as shown in FIGS. 19 and 20. More specifically as shown in FIG. 19, the tool 410 is retained in a vertical orientation restrained by two adjacent vertical recesses 402. Similarly, the tool 410 is retained in a horizontal orientation restrained by two adjacent horizontal recesses 400, as shown in FIG. 20.

Fourth Embodiment

Figure 21:
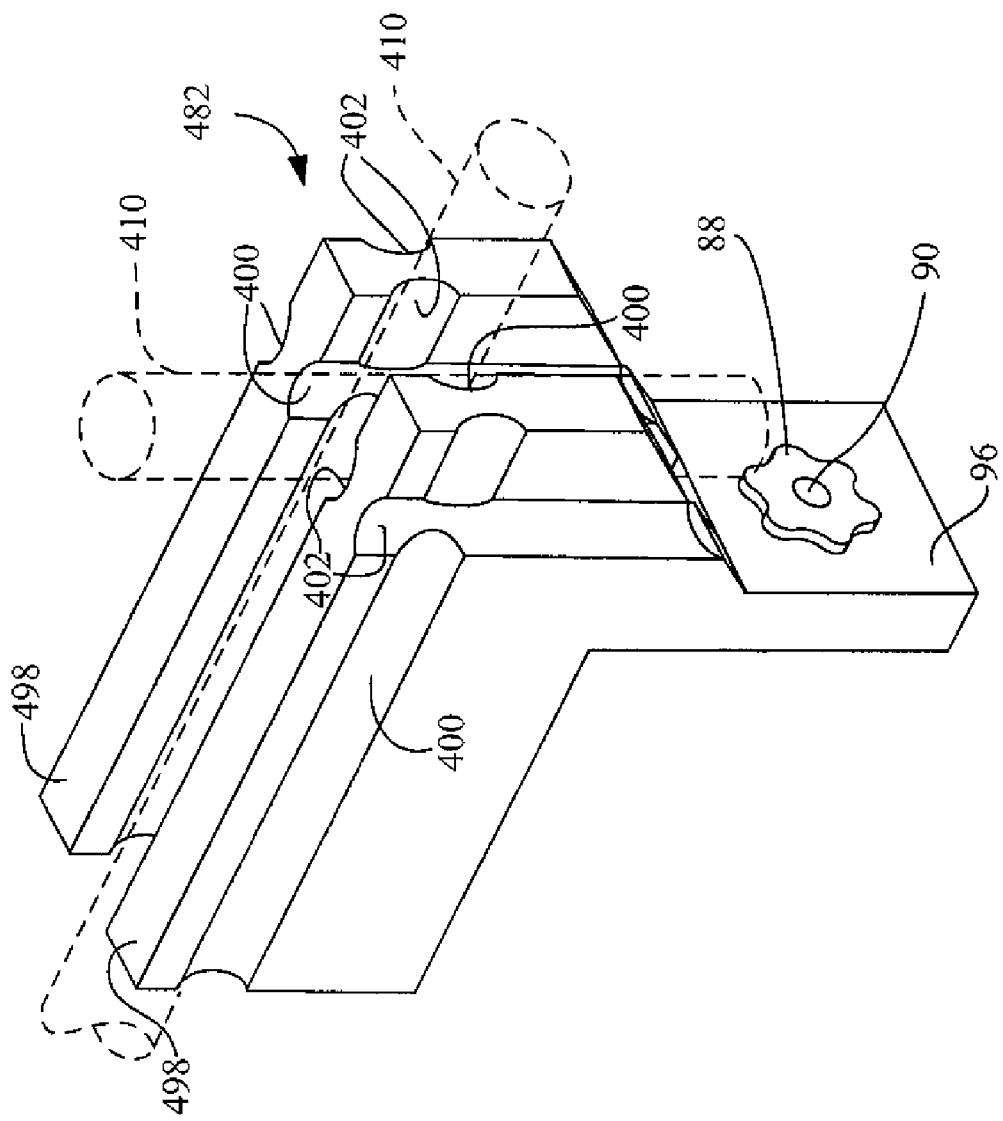
FIG. 21 is a perspective view of a cargo movement restricting member shown removed from the side wall of the vehicle in accordance with a fourth embodiment of the present invention.

Referring now to FIG. 21, a cargo movement restricting member 482 is depicted in accordance with a fourth embodiment of the present invention. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

The cargo movement restricting member 482 of the fourth embodiment can be used with the cargo bed 12 and installed in any of the utility tracks 38 described above with respect to the first and second embodiments.

The cargo movement restricting member 482 includes the mounting portion 96 and two upright portions 498. The upright portions 498 are oriented parallel to one another and are rigidly fixed to opposite ends of the mounting portion 96, as shown in FIG. 21. The mounting portion 96 includes the position knob 88 and the attachment bolt 90, the same as described above with respect to the movement restricting members 82 of the first and second embodiments.

The upright portions 498 are similar to the upright portions 398 of the third embodiment in that each of the cargo contacting surfaces of each of the upright portions 498 includes horizontal recesses 400 and vertical recesses 402, as shown in FIG. 21.

A pair of the horizontal recesses 400 face one another and a pair of the vertical recesses 402 face one another such that the horizontal recesses 400 or the vertical recesses 402 can retain a tool 410, as indicated in phantom in FIG. 21. More specifically, the tool 410 can be retained in a vertical orientation restrained by two adjacent vertical recesses 402. Similarly, the tool 410 can be retained in a horizontal orientation restrained by two adjacent horizontal recesses 400, as shown in FIG. 21.

The various truck related components of the vehicle 10 are conventional components that are well known in the art. Since vehicles 10, such as pickup trucks, are well known in the art, these structures will not be discussed or illustrated in detail herein.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention as used in the normal operating orientation. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A vehicle cargo bed, comprising:
a cargo bed floor having an approximately horizontal cargo bed surface;
a wall structure at least partially surrounding the cargo bed surface, at least a portion of the wall structure having an upper end, the upper end having an a proximately horizontal upper surface and opposing side surfaces that extend downward from the upper end; and
an attachment member secured to the upper end of the portion of the wall structure, the attachment member having a main section having a width and opposing side extensions that extend downward from opposite sides of the main section, the main section defining an approximately horizontal first surface disposed above the cargo bed surface, the side extensions extending downward along respective ones of the opposing side surfaces of the wall structure a distance that is less than the width of the main section, the first surface having linearly extending first scalar demarcations formed thereon.

2. The vehicle cargo bed according to claim 1 wherein
the portion of the wall structure includes a tailgate pivotally supported relative to the cargo bed surface for movement between an approximately vertical orientation and an approximately horizontal orientation, the attachment member being secured to the tailgate such that the first surface is approximately horizontal with the tailgate in the vertical orientation.

3. A vehicle cargo bed comprising:
a cargo bed floor having an approximately horizontal cargo bed surface;
a wall structure at least partially surrounding the cargo bed surface, at least a portion of the wall structure having an upper end, the portion of the wall structure including a tailgate pivotally supported relative to the cargo bed surface for movement between an approximately vertical orientation and an approximately horizontal orientation; and
an attachment member secured to the upper end of the portion of the wall structure defining an approximately horizontal first surface disposed above the cargo bed surface, the first surface having linearly extending first scalar demarcations formed thereon, the attachment member being secured to the tailgate such that the first surface is approximately horizontal with the tailgate in the vertical orientation, wherein
the tailgate includes a second surface extending in a direction perpendicular to the first surface, the second surface being oriented in an approximately vertical orientation with the tailgate in the vertical orientation, and
the attachment member includes a side portion that extends along at least a portion of the second surface, the side portion having linearly extending second scalar demarcations formed thereon.

4. The vehicle cargo bed according to claim 3 wherein
the tailgate includes a utility track fixed to the second surface extending along the second surface adjacent to the second scalar demarcations.

5. The vehicle cargo bed according to claim 2 wherein
one of the opposing side surfaces of the upper end extends in a direction perpendicular to the first surface with a utility track fixed to the one of the opposing side surfaces extending along the one of the opposing side surfaces in a direction generally parallel to a direction in which the first scalar demarcations linearly extend.

6. The vehicle cargo bed according to claim 5, further comprising:
a cargo movement restricting member installed to the utility track for selective movement along the utility track, the cargo movement restricting member including a cargo contact surface that extends approximately vertically upward above the first surface.

7. The vehicle cargo bed according to claim 5, further comprising:
a pair of cargo movement restricting members installed to the utility track for selective movement along the utility track, each of the cargo movement restricting members including a cargo contact surface that extends approximately vertically upward above the first surface.

8. The vehicle cargo bed according to claim 5, further comprising:
a distance marking cleat installed to the utility track for selective movement along the utility track, the cleat having a pointer dimensioned to align with respective ones of the first scalar demarcations as the cleat moves along the utility track.

9. The vehicle cargo bed according to claim 2 wherein
the attachment member comprises a decal having the linearly extending first scalar demarcations and secured to the tailgate.

10. The vehicle cargo bed according to claim 1 wherein
the portion of the wall structure includes an approximately vertical wall extending upward from one side of the cargo bed floor, the wall extending approximately a length of the cargo bed floor in a direction that is parallel to the length of the cargo bed floor.

11. The vehicle cargo bed according to claim 10 wherein
the attachment member, the first surface and the first scalar demarcations extend approximately a length of the wall in a direction that is parallel to the length of the cargo bed floor.

12. A vehicle cargo bed, comprising:
a cargo bed floor having an approximately horizontal cargo bed surface;
a wall structure at least partially surrounding the cargo bed surface, at least a portion of the wall structure having an upper end, the portion of the wall structure including an approximately vertical wall extending upward from one side of the cargo bed floor, the wall extending approximately a length of the cargo bed floor in a direction that is parallel to the length of the cargo bed floor; and
an attachment member secured to the upper end of the portion of the wall structure defining an approximately horizontal first surface disposed above the cargo bed surface, the first surface having linearly extending first scalar demarcations formed thereon,
wherein
the first surface of the attachment member includes linearly extending second scalar demarcations adjacent to the first scalar demarcations with the first scalar demarcations having numeric indicia starting at a first end of the first surface and extending to a second end of the first surface, and the second scalar demarcations having numeric indicia starting at the second end and extending to the first end of the first surface.

13. The vehicle cargo bed according to claim 10 wherein
one of the opposing side surfaces of the upper end extends in a direction approximately perpendicular to the first surface, the wall further including a utility track fixed to and extending along the one of the opposing side surfaces adjacent to and approximately parallel to the first surface.

14. The vehicle cargo bed according to claim 13, further comprising:
a cargo movement restricting member installed to the utility track for selective movement along the utility track, the cargo movement restricting member including a cargo contact surface that extends approximately vertically above the first surface.

15. The vehicle cargo bed according to claim 13, further comprising:
a pair of cargo movement restricting members installed to the utility track for selective movement along the utility track, each of the cargo movement restricting members including a cargo contact surface that extends approximately vertically upward above the first surface.

16. The vehicle cargo bed according to claim 15, further comprising:
a distance marking cleat installed to the utility track for selective movement along the utility track, the cleat having a pointer dimensioned to align with respective ones of the first scalar demarcations as the cleat moves along the utility track.

17. The vehicle cargo bed according to claim 13, further comprising:
a distance marking cleat installed to the utility track for selective movement along the utility track, the cleat having a pointer dimensioned to align with respective ones of the first scalar demarcations as the cleat moves along the utility track.

18. The vehicle cargo bed according to claim 16 wherein the wall structure includes a tailgate pivotally supported relative to the cargo bed floor for movement between an approximately vertical orientation and an approximately horizontal orientation, the tailgate having a tailgate attachment member secured thereto defining a second surface that is approximately horizontally oriented with the tailgate in the vertical orientation, the second surface provided with linearly extending second scalar demarcations formed thereon.

19. The vehicle cargo bed according to claim 18 wherein the tailgate includes a third surface extending in a direction perpendicular to the second surface, the third surface being oriented in an approximately vertical orientation with the tailgate in the vertical orientation, and
the tailgate attachment member includes a side portion that extends along at least a portion of the third surface, the side portion having linearly extending third scalar demarcations formed thereon.

20. The vehicle cargo bed according to claim 19 wherein the tailgate includes a second utility track fixed to and extending along the third surface adjacent to the third scalar demarcations.

21. The vehicle cargo bed according to claim 20, further comprising:
a second pair of cargo movement restricting members installed to the second utility track of the tailgate for selective movement along the second utility track of the tailgate, each one of the second pair of cargo movement restricting members including a cargo contact surface that extends upward above the second surface.

22. The vehicle cargo bed according to claim 21, further comprising:
a second distance marking cleat installed to the second utility track of the tailgate for selective movement along the second utility track, the second cleat having a pointer dimensioned to align with respective ones of at least one of the second and third scalar demarcations as the second cleat moves along the second utility track.

23. A vehicle cargo bed, comprising:
a cargo bed floor having an approximately horizontal cargo bed surface;
a wall structure at least partially surrounding the cargo bed surface, at least a portion of the wall structure having an upper end, the portion of the wall structure including an approximately vertical wall extending upward from one side of the cargo bed floor, the wall extending approximately a length of the cargo bed floor in a direction that is parallel to the length of the cargo bed floor; and
an attachment member secured to the upper end of the portion of the wall structure defining an approximately horizontal first surface disposed above the cargo bed surface, the first surface having linearly extending first scalar demarcations formed thereon,
wherein
the wall structure includes a tailgate pivotally supported relative to the cargo bed floor for movement between an approximately vertical orientation and an approximately horizontal orientation, the tailgate having a tailgate attachment member defining a second surface that is approximately horizontally oriented with the tailgate in the vertical orientation, the second surface provided with linearly extending second scalar demarcations formed thereon.

24. The vehicle cargo bed according to claim 23 wherein the tailgate includes a third surface extending in a direction perpendicular to the second surface, the third surface being oriented in an approximately vertical orientation with the tailgate in the vertical orientation, and
the tailgate attachment member includes a side portion that extends along at least a portion of the third surface, the side portion having linearly extending third scalar demarcations formed thereon.

25. The vehicle cargo bed according to claim 24 wherein the tailgate includes a utility track fixed to and extending along the third surface adjacent to the third scalar demarcations.

26. The vehicle cargo bed according to claim 25, further comprising:
a pair of cargo movement restricting members installed to the utility track of the tailgate for selective movement along the utility track of the tailgate, each of the cargo movement restricting members including a cargo contact surface that extends upward above the second surface.

27. The vehicle cargo bed according to claim 26, further comprising:
a distance marking cleat installed to the utility track of the tailgate for selective movement along the utility track of the tailgate, the cleat having a pointer dimensioned to align with respective ones of at least one of the second and third scalar demarcations as the cleat moves along the utility track.

28. The vehicle cargo bed according to claim 10 wherein the attachment member comprises a decal having the linearly extending first scalar demarcations thereon and secured to the wall.

29. The vehicle cargo bed according to claim 1 wherein the attachment member includes a decal secured to the upper end of the portion of the wall structure having the linearly extending first scalar demarcations formed thereon.

30. The vehicle cargo bed according to claim 1 wherein the portion of the wall structure includes an approximately vertical wall disposed at one side of the cargo bed floor, the attachment member, the first surface and the scalar demarcations extending approximately a length of the wall along the one side of the cargo bed floor, one of the opposing side surfaces of the upper end extends in a direction approximately perpendicular to the first surface, with a utility track fixed to and extending along the one of the opposing side surfaces adjacent to and approximately parallel to the first surface,
the wall structure includes a tailgate pivotally supported relative to the cargo bed floor for movement between an approximately vertical orientation and an approximately horizontal orientation, the tailgate having a tailgate attachment member secured thereto defining a second surface that is approximately horizontally oriented with the tailgate in the vertical orientation, the second surface provided with linearly extending second scalar demarcations formed thereon,
the tailgate includes a third surface extending in a direction perpendicular to the second surface, the third surface being oriented in an approximately vertical orientation with the tailgate in the vertical orientation, the tailgate includes a second utility track fixed to and extending along the third surface, further comprising a pair of cargo movement restricting members installed to one of the second utility track of the tailgate and the utility track of the wall for selective movement along the one of the second utility track of the tailgate and the utility track of the wall, each of the cargo movement restricting members including a cargo contact surface that extends upward, and a distance marking cleat installed to one of the second utility track of the tailgate and the utility track of the wall for selective movement along the one of the second utility track of the tailgate and the utility track of the wall, the cleat having a pointer dimensioned to align with respective ones of one of the first and second scalar demarcations as the cleat moves along the one of the second utility track and the utility track of the wall.

31. The vehicle cargo bed according to claim 1 wherein the main section of the attachment member is directly secured to the upper end of the wall structure and is not directly secured to the opposing side surfaces.

32. The vehicle cargo bed according to claim 1 wherein the main section of the attachment member conforms to an overall shape of the upper end of the wall structure, and overlays the upper end of the wall structure and corresponding sections of the opposing side surfaces.

* * * * *